Aug. 22, 1950  J. H. W. BEGEROW  2,519,871
MOTORIZED TORCH HOLDER
Filed Sept. 27, 1949  2 Sheets-Sheet 2

INVENTOR
JOHN H.W. BEGEROW
BY
ATTORNEYS

Patented Aug. 22, 1950

2,519,871

UNITED STATES PATENT OFFICE 2,519,871

MOTORIZED TORCH HOLDER

John H. W. Begerow, Wood-Ridge, N. J., assignor to Air Reduction Company, Incorporated, New York, N. Y., a corporation of New York Application September 27, 1949, Serial No. 118,147

5 Claims. (Cl. 266—23)

This invention relates to motorized torch holders and particularly to an improved motor-driven device for raising and lowering a torch employed for welding, cutting or heat-treating metals.

In the art of treating metals with an oxyacetylene torch, and particularly in the cutting of metals by means of a jet of oxygen and auxiliary heating flames, it is common practice to employ machines with elements which are electrically motor-driven and subject to remote control. The raising and lowering of the torch or torches by remote control is an important function of such machines. For example, in the pantograph type of cutting machine employed for multiple shape cutting, one or more torches is mounted on a torch bar which is guided by a template tracing device. In most instances, the torch or torches are clamped directly to the torch bar and may be raised or lowered only by manual operation. This is a disadvantage when working on pieces of irregular contour and when replacing the workpieces under the torch or torches with new pieces. Attempts heretofore to arrange the machine so as to permit motorized raising or lowering of the torch or torches has resulted in inherent deficiencies in structural design and functional flexibility.

It is the object of the present invention to provide a more flexible and otherwise satisfactory mechanism whereby a torch or torches may be raised or lowered by electrical motor drive under remote control.

Another object is the provision of a motorized torch holder which is sturdy, efficient and better suited to the work and is particularly free from complicated mechanisms which are liable to get out of order.

A further object of the invention is the provision of a mechanism which is operable with the minimum of lubrication and is therefore unaffected by the high temperatures and contaminating dust which are incident to the operation of oxyacetylene torches.

Other objects and advantages of the invention will be apparent as it is better understood by reference to the following specification and the accompanying drawing, in which Fig. 1 is an elevation partially in section of a torch holder embodying the invention;

Figure 1:
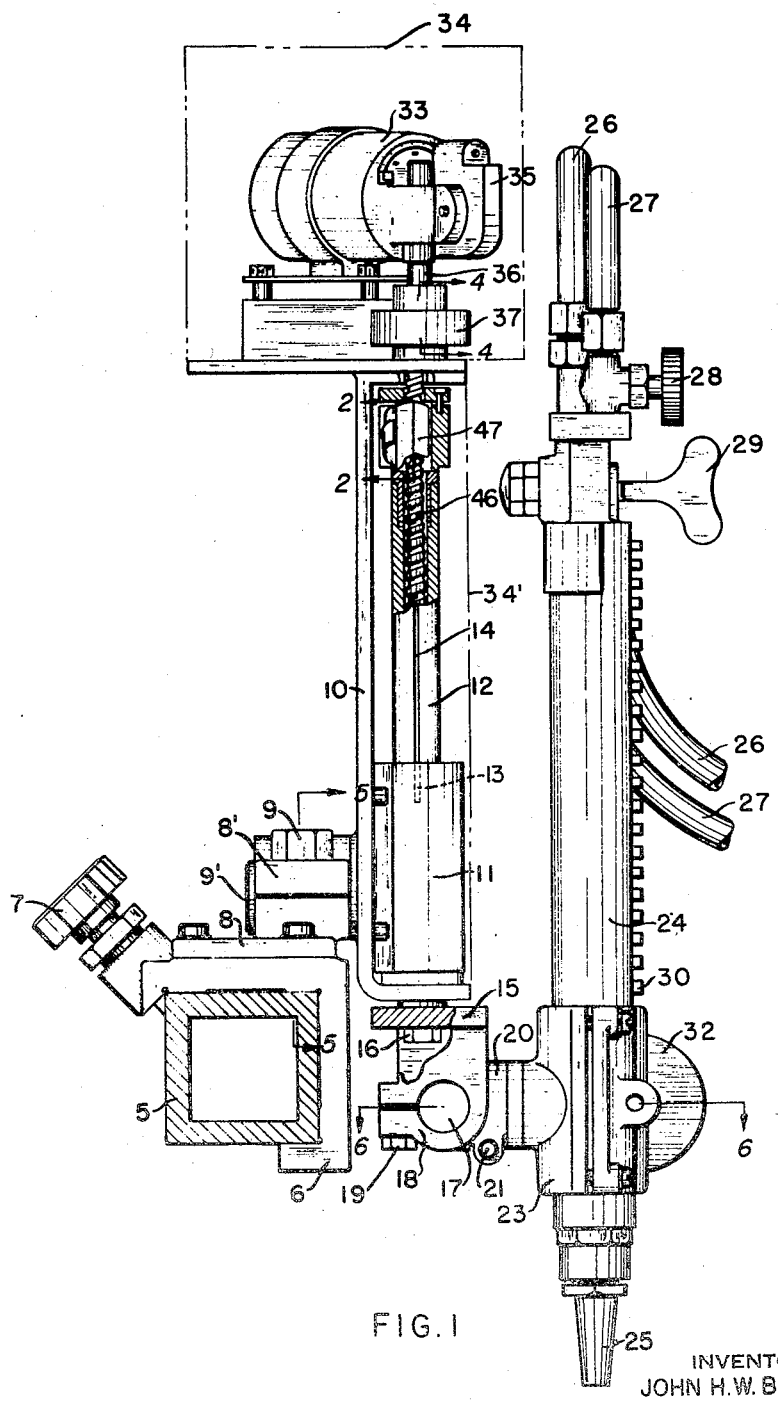
Figure 2:
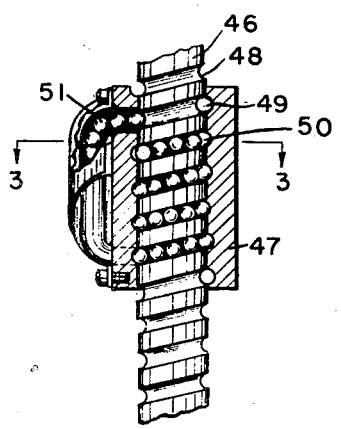
Fig. 2 is a section on the line 2—2 of Fig. 1.
Figure 3:
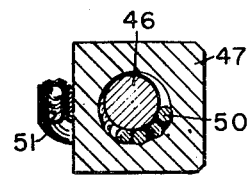
Fig. 3 is a section on the line 3—3 of Fig. 2.

Referring to the drawing, 5 indicates a torch bar which may be of any suitable section, preferably rectangular. The torch bar is supported by any suitable mechanism forming no part of the present invention, so that the bar will afford a rigid support for the torch or torches. A clamp 6 engages the torch bar 5, is slidable longitudinally thereof and is adapted to be held in the desired position by a clamping screw 7. Upon the clamp 6, a bracket 8 is fixedly fastened. The bracket 8 carries a split clamp 8' which embraces a stud 9' of a frame 10 carrying a tubular collar 11. A screw 9 is adapted to tighten the clamp 8' about the stud 9' and to permit adjustment of the frame 10 about the axis of the stud 9'. A tube 12 is mounted for vertical sliding movement in the collar 11, being held from rotation with respect thereto by a key 13 engaging a keyway 14. At the lower end of the tube 12 a yoke 15 is secured for pivotal movement about the axis of the tube 12 by means of a nut 16. The yoke 15 carries a pin 17 which is held by clamps 18 secured by screws 19. A collar 20 is supported on the pin 17 and adjustably secured by a screw 17'. A stud 22 supporting a torch holder 23 is adjustably mounted in a recess in the collar 20 and held by screw 21.

A torch 24, having a tip 25, is mounted in the torch holder 23. The torch may be of any suitable design adapted for welding, cutting or heat-treating metal. The details thereof form no part of the present invention. The torch may be supplied with gases through tubes 26 and 27 and control valves 28 and 29 may be provided. Any other suitable means for controlling the feeding of gases to the torch may be employed. At one side, the torch is provided with a rack 30 which engages a pinion 31 mounted in the torch holder and adapted to be rotated by a hand wheel 32. Thus the torch 24 may be raised and lowered manually in the torch holder in accordance with the usual construction.

Upon the upper end of the frame 10 a motor 33 is mounted. It may be enclosed by a dust cover 34, indicated in dotted lines on the drawing. A speed reducing mechanism 35, of conventional design, may be secured to the motor 33 so that the shaft 36 operates at the required speed. The motor 33 is reversible so that the shaft 36 may be turned in either direction, and the motor is actuated by remote control (not shown). The electrical circuits permitting remote control of the motor are conventional and form no part of the present invention.

Figure 4:
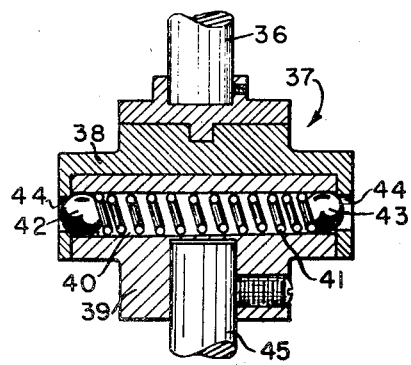
Fig. 4 is a section on the line 4—4 of Fig. 1.
Figure 5:
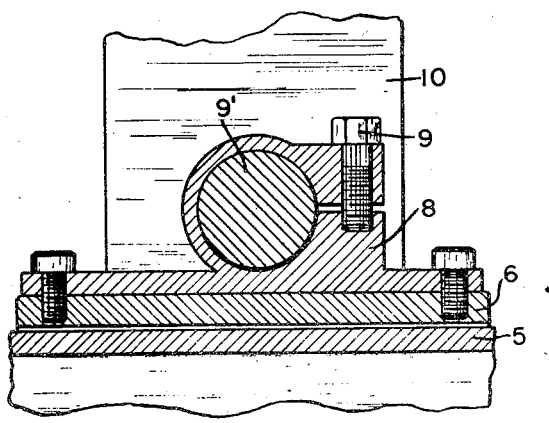
Fig. 5 is a section on the line 5—5 of Fig. 1.
Figure 6:
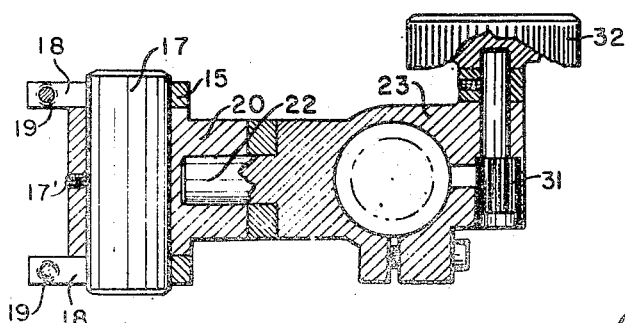
Fig. 6 is a section on the line 6—6 of Fig. 1.

The shaft 36 is, as best shown in Fig. 4, connected to a torque-limiting coupling indicated at 37. This coupling consists of a member 38 and a co-operating member 39. The member 39 has a transverse passage 40 carrying a spring 41 which bears upon balls 42 and 43 at the ends of the transverse passage 40. The balls engage recesses 44 in the member 38. The spring 41 is of sufficient strength to maintain the driving connection between the parts 38 and 39, so long as excessive torque is not exerted by the shaft 36. However, at the limit of upward or downward movement of the torch 24 under actuation of the motor 33, the torque applied by the shaft 36 will cause the balls 42 and 43 to move inwardly so that the parts 38 and 39 are thereby disconnected and injury to the motor is thus avoided. To move the tube 12 upwardly or downwardly in the sleeve 11, and thus shift the relation of the torch 24 to the workpiece, a shaft 45 is connected to the member 39 of the torque-limiting coupling and carries at its lower end a jackscrew 46 operating in a nut 47 which is secured to the upper end of the sleeve 12. Instead of employing a conventional Acme screw and nut, the screw 46 and the nut 47 are provided with raceways 48 and 49 to receive a plurality of ball bearings 50. When torque is applied to the screw 46, the ball bearings 50 become the medium of rolling engagement between the screw and nut. A return circuit passage 51 is provided in the nut 47 so that the ball bearings circulate in either direction as the nut 47 rotates on the screw 46. This device affords a practically friction-free connection between the shaft 45 and the sleeve 12, causing the sleeve to be elevated or depressed in accordance with the direction of rotation of the motor 33. Moreover, the connection can be operated without lubrication, which is an important advantage in an oxyacetylene machine in which any lubricant will pick up abrasive foreign matter which is inevitably present in the atmosphere surrounding the oxyacetylene flame when applied to metal. Lubrication, moreover, is undesirable because dirt inevitably sticks to the lubricant, and exposure to the hot flame temperature causes the lubricant to gum up and thus prevents its proper function.

The tubular sleeve 11 is preferably made of a suitable material such as graphite bronze or is lined therewith, so that it also can be operated dry. Consequently no lubricant is required in the region where the high temperature and dust in the atmosphere would affect it. The motor 33, as indicated, can be protected readily by the dust cover 34. A dust cover 34' extends about the jackscrew 46. Consequently the apparatus is unaffected by the conditions of operation and is not likely to get out of order after a brief period of operation.

It will be noted that the apparatus is substantially universally adjustable. It may be moved longitudinally on the torch bar 5, adjusted about the axis of the tube 12 and about the two horizontal axes of the pin 17 and stud 22. Because the entire device may be inclined instead of just the torch, it is possible to cut bevels and raise and lower the torch without putting a step in the bevel. The adjustment of the entire torch holder about the axis of the tube 12 permits the torch to be accurately centered over the line of work without inclining the torch. This is particularly advantageous where several torches on a single machine are to be aligned for cutting along a common line.

If desired, an adapter can be secured to the stud 8' with a stud at right angles to a clamp engaging the stud 8' which in turn can engage the clamp 8'. The torch can then be inclined about a horizontal axis parallel to the bar 5.

The apparatus may be used on any torch machine, whether for welding, cutting or heat treating. The units may be used singly or in multiples. When two or more units are used on a single cutting machine, they are preferably electrically interconnected in such a manner that each may be individually raised or lowered, or all may be simultaneously actuated. This is most simply accomplished by putting a multiple contact switch in parallel with the individual control switches. However, as indicated, the electrical connections are not a part of the invention, which is directed to the provision of a motor-driven torch holder including the improvements described.

Various changes may be made in the details of the structure without departing from the invention or sacrificing the advantages thereof.

I claim:

1. A motorized torch holder adapted to raise and lower a torch with reference to the workpiece comprising a frame, a support therefor, a guide tube in the frame, a vertically movable member in the guide tube, a torch bracket connected to the vertically movable member, a motor, a shaft driven by the motor, a jack screw, a mechanical torque-limiting device connecting the shaft and the screw, and a nut co-operating with the screw and connected to the vertically movable member whereby rotation of the motor shaft in opposite directions alternately raises and lowers the torch bracket.

2. A motorized torch holder adapted to raise and lower a torch with reference to the workpiece comprising a frame, a support therefor affording pivoted movement about a horizontal axis, a guide tube in the frame, a vertically movable member in the guide tube, a torch bracket connected to the vertically movable member, a motor, a shaft driven by the motor, a jack screw, a mechanical torque-limiting device connecting the shaft and the screw, and a nut co-operating with the screw and connected to the vertically movable member whereby rotation of the motor shaft in opposite directions alternately raises and lowers the torch bracket.

3. A motorized torch holder adapted to raise and lower a torch with reference to the workpiece comprising a frame, a support therefor, a guide tube in the frame, a vertically movable member in the guide tube, a torch bracket connected to the vertically movable member, a motor, a shaft driven by the motor, a jack screw, a mechanical torque-limiting device connecting the shaft and the screw, and a nut cooperating through ball bearings with the screw and connected to the vertically movable member whereby rotation of the motor shaft in opposite directions alternately raises and lowers the torch bracket.

4. A motorized torch holder adapted to raise and lower a torch with reference to the workpiece comprising a frame, a support therefor, a guide tube in the frame, a vertically movable member in the guide tube, a torch bracket connected to the vertically movable member and pivotally movable about the axis of the vertically movable member and about two axes perpendicular thereto, a motor, a shaft driven by the motor, a jack screw, a mechanical torque-limiting device connecting the shaft and the screw, and a nut co-operating with the screw and connected to the vertically movable member whereby rotation of the motor shaft in opposite directions alternately raises and lowers the torch bracket.

5. A motorized torch holder adapted to raise and lower a torch with reference to the workpiece comprising a frame, a support therefor, a guide tube in the frame, a vertically movable member in the guide tube, a torch bracket connected to the vertically movable member, a motor, a shaft driven by the motor, a jack screw, a mechanical torque-limiting device connecting the shaft and the screw and consisting of cooperating members, a recess in one of the members, balls at opposite ends of the recess, and a spring between the balls, the other member having openings to receive the balls, and a nut cooperating with the screw and connected to the vertically movable member whereby rotation of the motor shaft in opposite directions alternately raises and lowers the torch bracket.

JOHN H. W. BEGEROW.

REFERENCES CITED

The following references are of record in the file of this patent:

UNITED STATES PATENTS

| Number    | Name          | Date          |
|-----------|---------------|---------------|
| 2,203,210 | Young         | June 4, 1940  |
| 2,294,187 | Kullman et al.| Aug. 25, 1942 |
| 2,336,596 | Chouinard     | Dec. 14, 1943 |
| 2,416,399 | McKiernan     | Feb. 25, 1947 |